United States Patent [19]
Fan

[11] Patent Number: 5,588,086
[45] Date of Patent: Dec. 24, 1996

[54] FIBER OPTIC HERMETIC BULKHEAD PENETRATOR FEEDTHROUGH MODULE AND METHOD OF FABRICATING SAME

[75] Inventor: Robert J. Fan, Canoga Park, Calif.

[73] Assignee: LiteCom, Inc., Canoga Park, Calif.

[21] Appl. No.: 41,724

[22] Filed: Apr. 1, 1993

[51] Int. Cl.⁶ .................................................... G02B 6/00
[52] U.S. Cl. ......................... 385/138; 385/137; 385/139; 174/70 S; 174/11 R
[58] Field of Search ............................. 385/138, 60, 72, 385/137, 139; 174/70 S, 11 R, 23 R, 151, 152 GM

[56] References Cited

U.S. PATENT DOCUMENTS

| | | | |
|---|---|---|---|
| 4,678,868 | 7/1987 | Kraska et al. | 174/152 GM |
| 4,822,130 | 4/1989 | Maranto et al. | 385/138 |
| 4,859,021 | 8/1989 | Wall | 385/138 |
| 4,891,640 | 1/1990 | Ip | 385/138 X |
| 5,155,795 | 10/1992 | Wasserman et al. | 385/138 |
| 5,177,806 | 1/1993 | Abbott et al. | 385/138 X |

*Primary Examiner*—Rodney B. Bovernick
*Assistant Examiner*—Phan T. H. Palmer

[57] ABSTRACT

A hermetically sealed fiber optic feedthrough module which comprises a metal or other rigid material connector feedthrough or sleeve feedthrough with a single fiber optic member or with a multitude of optical fibers extending through and protruding out of either side of the connector feedthrough or sleeve feedthrough and a pressure-blocking sealant material of polycrystalline which surrounds the fiber optic member(s) and provides a seal between the fiber optic member(s) and the inside surface of the connector or sleeve feedthrough. The feedthrough module is made by positioning the fiber optic member(s) through the connector or sleeve feedthrough and applying the polycrystalline sealant material between the fiber optic member(s) and the connector or sleeve feedthrough inside diameter to fill all voids between the fiber optic member(s) and connector or sleeve feedthrough. Heat is then applied to "set" the polycrystalline or other material which provides hermetically sealed intimate contact between the various feedthrough module components.

31 Claims, 10 Drawing Sheets

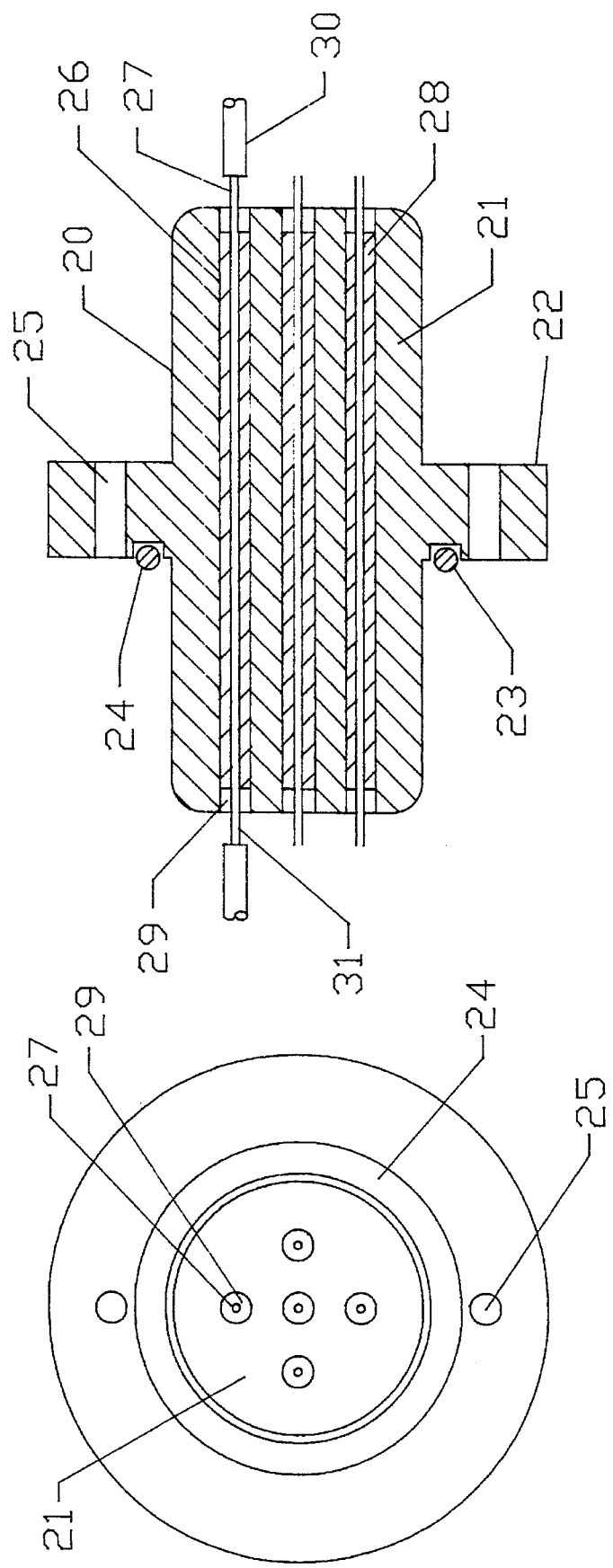

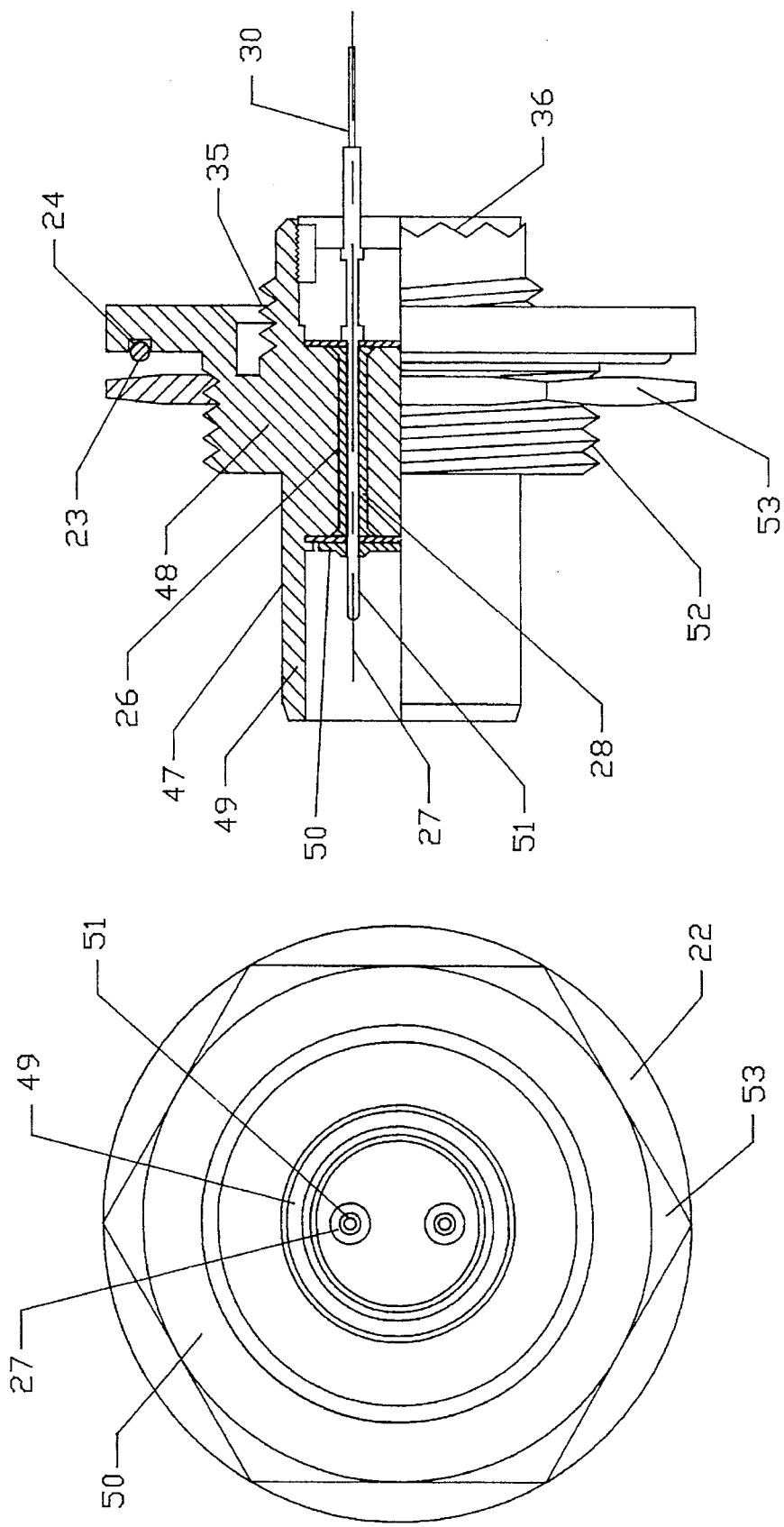

FIBER OPTIC HERMETIC BULKHEAD PENETRATOR FEEDTHROUGH MODULE AND METHOD OF FABRICATING SAME

FIELD OF THE INVENTION

This invention relates to connecting and/or through-penetrating hermetic bulkhead feedthrough systems for fiber optic signal transmission in applications which in particular application demands extreme pressure differential and/or extreme temperature differential field conditions.

BACKGROUND OF THE INVENTION

The present invention relates to the field of hermetically sealed connector feedthrough modules which are subjected to pressure and temperature extremes, and is more particularly, an improved fiber optic feedthrough module configuration suited for use in such adverse environmental conditions. The present invention also delineates the structure of and the method of making a hermetically sealed fiber optic feedthrough module which will withstand adverse pressure and temperature extremes.

Connector or bulkhead penetration fiber optic feedthrough modules have particular application in systems such as in nuclear power facilities, rocket engines, and other types of explosive environments where durability and rugged performance requirements are critical.

In the past, electrical connector penetrant structures have been developed for passing one or a plurality of electrical conductors in a single module through a bulkhead structure while maintaining a pressure seal around the electrical conductors. Typical structures are shown in U.S. Pat. Nos. 3,601,526 and 3,680,208.

Fiber optic bulkhead penetrant feedthroughs have been developed which employ metallic film optical fiber protection and a compression method of assembly to hermetically seal the plurality of fibers within the feedthrough housing. Examples are U.S. Pat. Nos. 4,296,996, 4,593,970 and 4,891,640. Bulkhead feedthroughs typically accommodate pressure differentials of $10^{-6}$ to $10^{-8}$ cc/sec. helium leak rate. The invention described herein can provide up to $10^{-11}$ cc/sec. helium leak rate. Other feedthroughs are limited in component materials and structural limitations which can be accommodated such as U.S. Pat. Nos. 4,859,021, 4,822,130 and 4,682,846. The present invention can effectively bond glass, ceramic, metal or composite materials to optical fiber.

The use of electrical conductors has certain disadvantages in some applications such as an electromagnetic interaction between the conductors and/or the system around them. This interaction is either an inducted electrical current into a sensor or control line by an ambient changing magnetic field or the effect on the system of a changing magnetic field created by current flow in the electrical conductor.

With the advent of fiber optics, such electromagnetic disadvantages are avoided by the elimination of current flow down the conductor and replacing this current flow with optical pulses traveling along an optical waveguide. However, fiber optics also have unique disadvantages such as the fragility of the optical fiber elements to shear forces or micro-bending losses.

Accordingly, the primary object of the present invention is to provide a fiber optic feedthrough module which is capable of utilization in extremely hostile environmental conditions, to withstand pressures in excess of 30,000 psi and/or a temperature range of from 200° C. to higher than +200° C., or in nuclear environments to withstand a transient dose of $10^{12}$ rads or a total dose of $10^9$ rads, or to withstand high vibration levels of 40 G's with random vibration from 10 Hertz to 2000 Hertz, or to withstand high shock and acceleration levels.

The present invention overcomes the shortfall of previous fiber optic feedthrough modules in that there is no longitudinal force caused by a swaging operation to put the optical fiber in a possible compression mode which would cause micro-bending and excess signal losses in the optical fiber.

The present invention, a fiber optic feedthrough module, being capable of transmitting optical signal(s), can be employed as a component in applications such as suitable control circuits, and operatively associated with instrumentation where signal penetration through a bulkhead is required. The module may be sized to fit a particular application regarding the number of fibers contained in the feedthrough module in relation to the housing diameter or the length dimension in relation to the style of feedthrough module housing, and can be used with conventional hermetic bulkhead mounting and sealing hardware. The connector-style housing may utilize any standard electrical or fiber optic connector coupling mechanism.

Besides use in the Space Shuttle main engine type applications, said fiber optic feedthrough modules have practical application in nuclear power plants, in explosive environments, in pressure extremes (exceeding standard atmospheric pressure or in vacuum), in military and aerospace equipment exposed to high radiation levels, and in underwater applications that require a hermetically sealed feedthrough module.

BRIEF DESCRIPTION OF THE INVENTION

The present invention provides a hermetically sealed fiber optic feedthrough module for pressure and temperature differential extremes which comprises a connector or sleeve housing made out of metal, ceramic, glass, or other appropriate materials; fiber optic member(s) extending through said sleeve, the fibers which may be bare or buffered with protective metallic, organic or inorganic hermetic material; and an extremely high pressure temperature differential withstanding polycrystalline or other suitable hermetic sealing material which surrounds the fiber optic member(s) and provides a hermetic seal mutually between the fiber optic member(s) and the inside surfaces of the connector or sleeve feedthrough. The present invention also contemplates a method of fabricating such a feedthrough module by use of a heat activated or otherwise activated setting polycrystalline material or in addition to a pressure sealing of material approach.

The invention includes application of said material and fabrication techniques to various styles of bulkhead penetrating optical fiber feedthrough modules. These include but are not limited to the following:

(1) Provide through-penetration of the pressure/temperature differential bulkhead with continuous signal-carrying optical fibers/cables and optional backshell protection on both sides of the bulkhead;

(2) Provide bulkhead penetration with option of connectorization on one side of the bulkhead and buffered fiber or backshell strain relief protection for fiber/cable on the other side;

(3) Provide bulkhead penetration with option of connectorization on both sides of the bulkhead.

The invention may be applied to single channel or multi-channel fiber optic feedthrough modules. By using the polycrystalline or other heat-activated sealing material, the optical fibers are hermetically sealed to the housing style chosen to a leak rate level which surpasses other previously developed feedthrough modules. Bonding directly to aluminum can now be accomplished safely which is not possible with other sealing materials when providing extreme temperature and pressure differential withstanding sealing.

In bulkhead penetration feedthrough applications, fiber is typically passed through the pressure-differential bulkhead in a continuous, non-concatenated condition. The hole in the bulkhead through which the fiber passes must be thoroughly sealed to maintain the pressure differential. One embodiment of the invention is designed to provide a hermetic feedthrough with a housing to fit closely within a penetration opening of the bulkhead. A seal is provided such that when the flange of the housing is affixed to the bulkhead, the pressure differential can be maintained. The feedthrough-to-bulkhead seal may be provided by a compressed "O-ring" in a groove or by welding the feedthrough housing to the bulkhead. Within the housing, an "insert" area is machined integral to the housing and prepared with holes to accept fibers passing continuously through the holes. The portion of fiber which will pass through the "insert" hole must be stripped of buffer material and have a hermetic coating to assure proper sealing. Either a cylindrical sleeve of polycrystalline or other glass or ceramic sealing material is located slidingly about a fiber or a powdered form of the sealing material is placed around each fiber within said "insert" holes and the housing unit is "fired" (heat and/or pressure is applied) locally to "set" the sealing material and provide hermetic sealing.

In a variation of this embodiment, the housing has an inside diameter opening through the housing. This opening will accept a close fitting insert made of polycrystalline or other sealing material and said insert will have holes which will accept continuous fibers as prepared for the first embodiment of the invention. When the sealing insert, with the prepared fibers in place is placed within the housing and is locally "fired" to "set" the sealing insert material, the hermetic sealing is accomplished simultaneously between fibers and insert, and between insert and housing. The housing is sealed to the bulkhead in the same manner(s), with "O-ring," welding, etc. as described in the first embodiment of the invention.

Features of these variations of the first embodiment of the invention include options of fabricating the housing in such a manner as to provide standard or special connector rear accessory backshell threads or other configuration to allow use of a protective accessory backshell which typically provides ruggedization, protection, environmental sealing and strain relief to the fibers or fiber optic cables passing through said bulkhead feedthrough unit. These optional accessory accommodating features may be provided on one or both sides of the bulkhead. Feedthroughs may be single-channel or multi-channel.

A second embodiment of the invention is a feedthrough designed to provide hermetic sealing with a housing which fits closely within a penetration opening of the bulkhead where this housing is designed to have a connector receptacle coupling configuration on one side of the bulkhead and the option of a backshell accessory configuration as described in the first embodiment on the other side of the bulkhead. The connector receptacle coupling configuration may be of any standardized or custom design enabling coupling capability to a mating connector plug. The optical fiber(s) in this embodiment are continuous on the backshell (option) side of the feedthrough and are terminated in fiber optic pin termini within the housing, such that hermetic sealing is provided and such that the pin termini will mate with socket fiber optic termini provided within a mating connector plug which is compatible with said bulkhead-mounted fiber optic hermetic feedthrough. Hermetic sealing of the feedthrough housing within the bulkhead penetration hole is provided externally in the same manner as that of the housing described in the first embodiment of the invention. Hermetic sealing of the fiber optic termini is provided by first hermetically sealing optical fibers within the termini and then sealing the termini within the feedthrough housing insert through-holes. Sealing the optical fibers within the fiber optic termini is accomplished by first preparing the fiber end portion which will be captured within the pin terminus. This bare or hermetic-coated fiber end is hermetically sealed into the pin terminus by providing hermetic sealing material around the fiber and within the inside diameter of the pin terminus. This assembly is then "fired" to establish hermetic sealing. Fiber ends are polished at termini tips. The terminus is then slidingly fitted into a hole in the insert of the feedthrough housing and when a full complement of termini are clustered in the housing, the termini are "fired" into the housing by using one of the methods described in the first embodiment. The feedthroughs described in the second embodiment may also be single-channel or multi-channel feedthroughs.

A third embodiment of the invention is a feedthrough designed to provide hermetic sealing with a housing which fits closely within a penetration opening of the bulkhead where said housing is designed to have a connector receptacle coupling configuration on both sides of the bulkhead. The connector receptacle configurations may be the same or may be different (as adapters) and may be of any standardized or custom design enabling coupling to the proper mating connector plugs. The signal carrying optical fiber(s) in this embodiment are terminated in plugs on either side of the bulkhead and do not actually pass through the bulkhead. Completion of the optical signal transmission is provided by pin-pin double-ended termini within the feedthrough housing. These pin-pin termini are prepared with relatively short fibers hermetically sealed and terminated within the termini as described in the second embodiment termini. The prepared double-ended termini are then hermetically sealed within the housing insert holes after a full complement of the double-ended termini are placed in position and the unit "fired" to seal. Termini may be of the same or different configuration on opposite ends depending on what connector receptacle configuration is being used and what corresponding pin termini design is required to provide proper mating to socket termini in the mating plugs.

BRIEF DESCRIPTION OF THE DRAWINGS

The foregoing objects and other advantages will become apparent from the following detailed description of a preferred embodiment of said invention shown in the accompanying drawings in which:

FIG. 1 is a sectional view of an optical fiber bulkhead feedthrough module with through-penetration of the bulkhead;

FIG. 2 is an end view of the feedthrough of FIG. 1;

FIG. 10 is a sectional view of a bulkhead feedthrough module with provision for connectorization on one side and backshell protection of the fibers/cables on the other side of the bulkhead;

FIG. 11 is an end view of FIG. 10, viewed from the connectorization end;

DETAILED DESCRIPTION OF THE INVENTION

Figure 3:
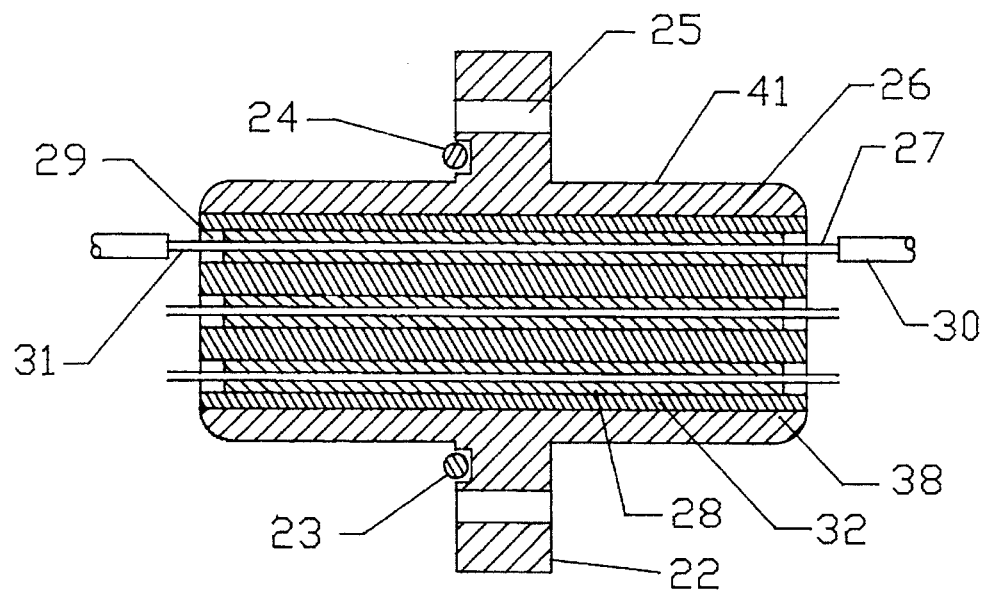
FIG. 3 is a sectional view similar to FIG. 1 with an installed and sealed insert member.

A feedthrough system 20 is shown generally in FIG. 1. Most of the parts are typical parts of feedthroughs used in pressure differential applications. The feedthrough system 20 is comprised of an optical fiber 27 or plurality of optic fibers, hermetic sealing material 28 and a feedthrough housing 21 which has an integral or sealed flange 22 for the purpose of mounting the feedthrough system 20 to a bulkhead. This feedthrough housing 21 may be comprised of metal, ceramic, glass or other appropriate materials. It may have various lengths dependent upon length of sealing-to-fiber desired. The reduced cross-sectional feedthrough housing 21 passes through a penetration opening in the bulkhead and a resilient or compressible sealing member 23, located in a recessed groove 24 provides differential pressure and differential temperature sealing when the feedthrough system 20 is bolted, welded or otherwise affixed to the bulkhead using holes 25 or other means to affix feedthrough housing flange 22 to said bulkhead. The feedthrough housing 21 has one or a plurality of lengthwise holes 26 passing through the unit. These single or plurality of holes have optical fiber 27 stripped of protective buffer coat 30, passing lengthwise through the feedthrough assembly 21 with hermetic sealing material 28 surrounding the fiber. This hermetic sealing material 28 (may be polycrystalline or other, heat-activated, time activated or otherwise activated) provides a hermetic seal to both the periphery of the optical fiber 27 and to the inside of the lengthwise holes 26. An unsealed portion 29 of the lengthwise holes may occur if desired for any reason, such as allowing use of a close-fitting resilient or otherwise strain relief member around the fiber(s). The periphery of the optical fiber 27 will usually have a hermetic coating 31 which ensures hermetic bonding and sealing of hermetic sealing material 28 to the periphery of optical fiber 27. The end-view of FIG. 1 appears in FIG. 2 which shows the ends of a plurality of optical fibers 27 hermetically sealed and passing through the feedthrough system 20.

A feedthrough system 41 similar to FIG. 1 can be seen in FIG. 3. However, the lengthwise through-holes 26 of FIG. 1 are herein provided in an insert sleeve 32 made out of metallic or hermetic sealing material to be sealed hermetically into feedthrough housing 38.

Figures 4, 5:
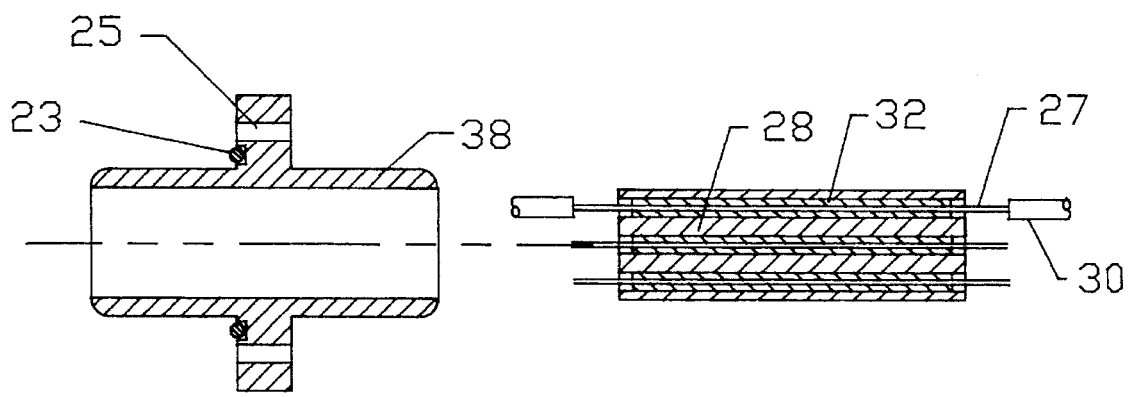
FIG. 4 is a sectional view of the housing from FIG. 3.
FIG. 5 is a sectional view of the insert member from FIG. 3.

The separate feedthrough housing 38 and insert sleeve 32 are seen in FIG. 4 and FIG. 5 respectively.

The separate feedthrough housing 38 and insert sleeve 32 are joined hermetically after the optical fiber 27 hermetic sealing material 28 and insert sleeve 32 have first been hermetically sealed intimately to one another. All other features and details of FIG. 3 are the same as in FIG. 1.

Figure 6:
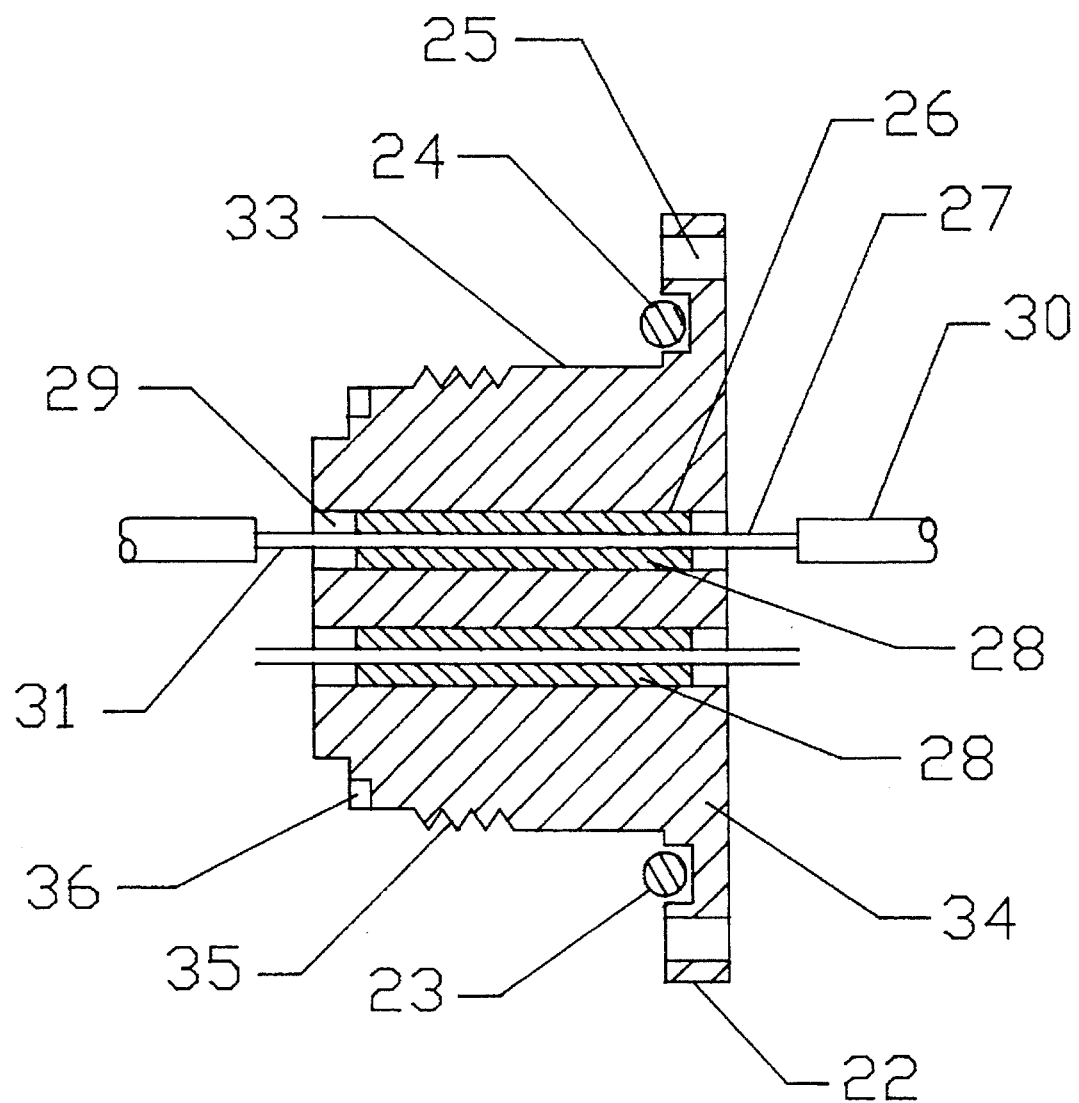
FIG. 6 is a sectional view of a multichannel optical fiber bulkhead feedthrough module with through-fiber penetration of the bulkhead and backshell protection on one side of the bulkhead.

A feedthrough system 33 is shown generally in FIG. 6. The feedthrough system 33 is comprised of an optical fiber 27 or plurality of optical fibers, hermetic sealing material 28 and a feedthrough housing 34 which has a flange 22 with a seal 23 located in groove 24 and mounting holes (optional) 25 as described for FIG. 1. The feedthrough housing 34 has one end which accommodates hermetically coated fiber as in FIG. 1 and the other end which provides for an accessory backshell device protecting the buffered fiber 30 or unbuffered fiber 27 at the left side of FIG. 6. Screw threads 35 or other means are provided to assure adequate mechanical, ruggedized joining of backshell and feedthrough system 33. Anti-rotational serrations 36 may be provided to assure the backshell does not rotate when the backshell coupling ring is threaded onto screw threads 35 to affix backshell to feedthrough housing 34. Through holes 26, hermetic sealing material 28, unsealed portion 29 (optional) and optical fiber 27 with hermetic coating 31 and buffer coat 30 are as described for FIG. 1 having the same relationship to one another and to feedthrough housing 34 in FIG. 6 as they had to feedthrough housing 21 in FIG. 1.

Figure 7:
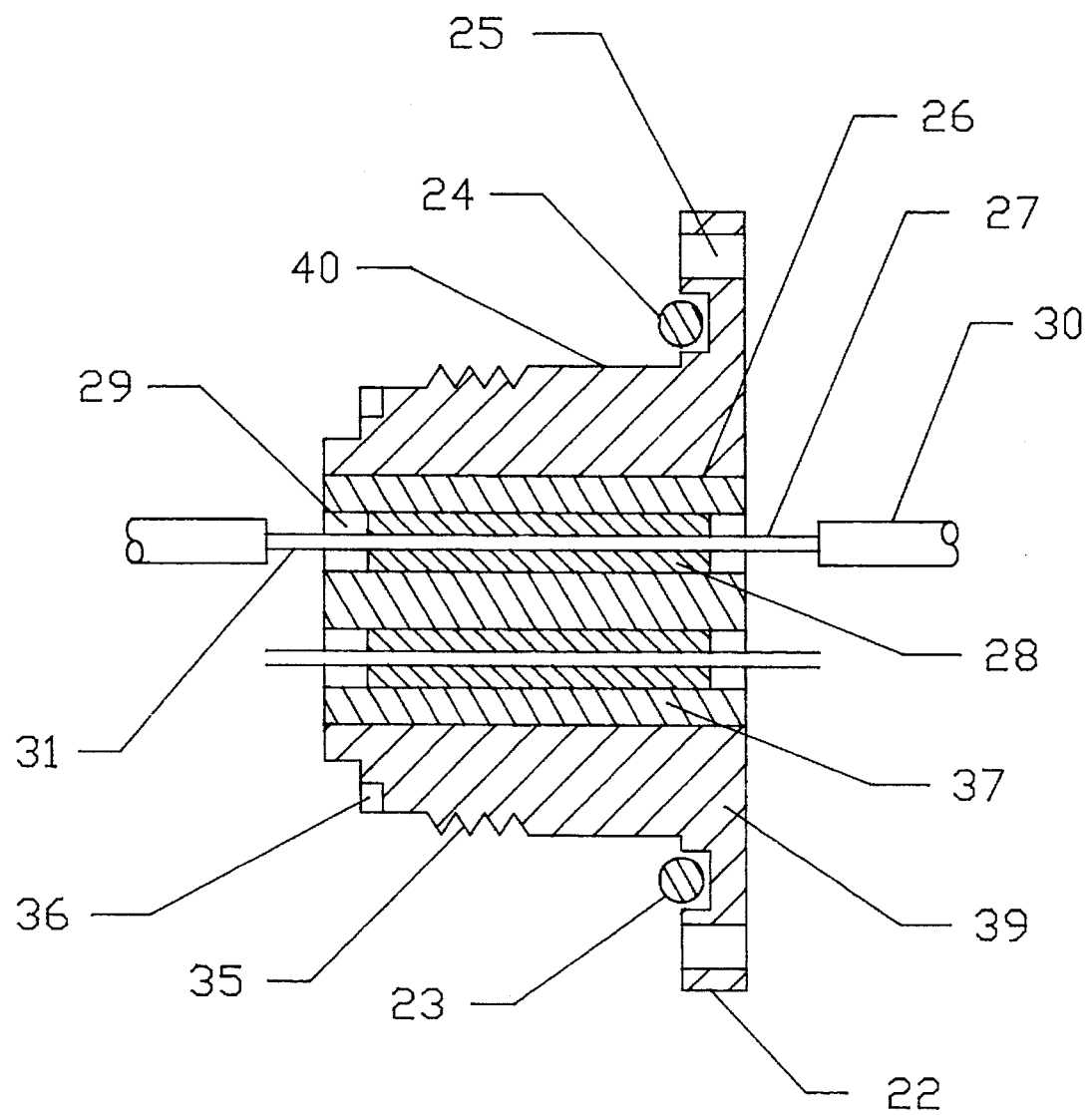
FIG. 7 is a sectional view similar to FIG. 6 with an installed and sealed insert member.

A feedthrough system 40 similar to FIG. 6 can be seen in FIG. 7. However, the lengthwise through-holes 26 of FIG. 6 are herein provided in an insert sleeve 37 made out of metallic or hermetic sealing material which is to be sealed hermetically into feedthrough housing 39. The separate feedthrough housing 39 and insert sleeve 37 are joined hermetically after the optical fiber 27, hermetic sealing material 28 and insert sleeve 37 have first been hermetically sealed intimately to one another. All other features and details of FIG. 7 are the same as in FIG. 6.

Figure 8:
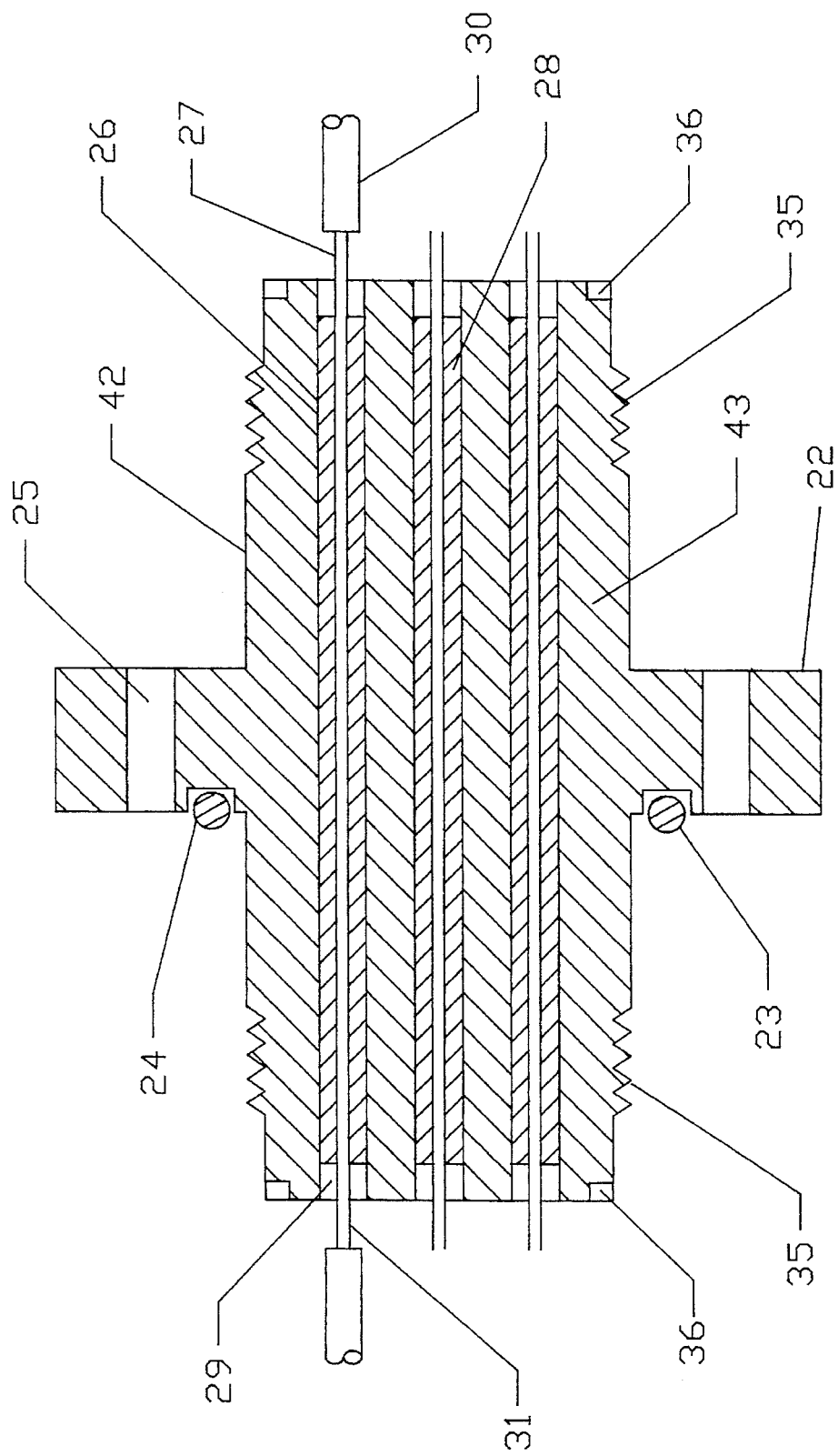
FIG. 8 is a sectional view of a bulkhead feedthrough module as in FIG. 2 except the feedthrough module has provision for backshell protection of the fibers or cables on both sides of the bulkhead.

A feedthrough system 42 is shown generally in FIG. 8. The feedthrough system 42 is comprised of an optical fiber 27 or plurality of optical fibers, hermetic sealing material 28 and a feedthrough housing 43 which has a flange 22 with a seal 23 located in groove 24 and mounting holes (optional) 25 as described for FIG. 1. This feedthrough housing 43 has both ends with provision for mounting an accessory backshell protective device. The accessory backshell device protects buffered fiber 30 and unbuffered fiber 27 at both sides of FIG. 8. Screw threads 35 and anti-rotational serrations 36 serve the same functions described in FIG. 6. Through holes 26, hermetic sealing material 28, unsealed portion 31, and buffer coat 30 are as described in FIG. 1, having the same relationship to one another and to feedthrough housing 43 in FIG. 8 as they had to feedthrough housing 21 in FIG. 1.

Figure 9:
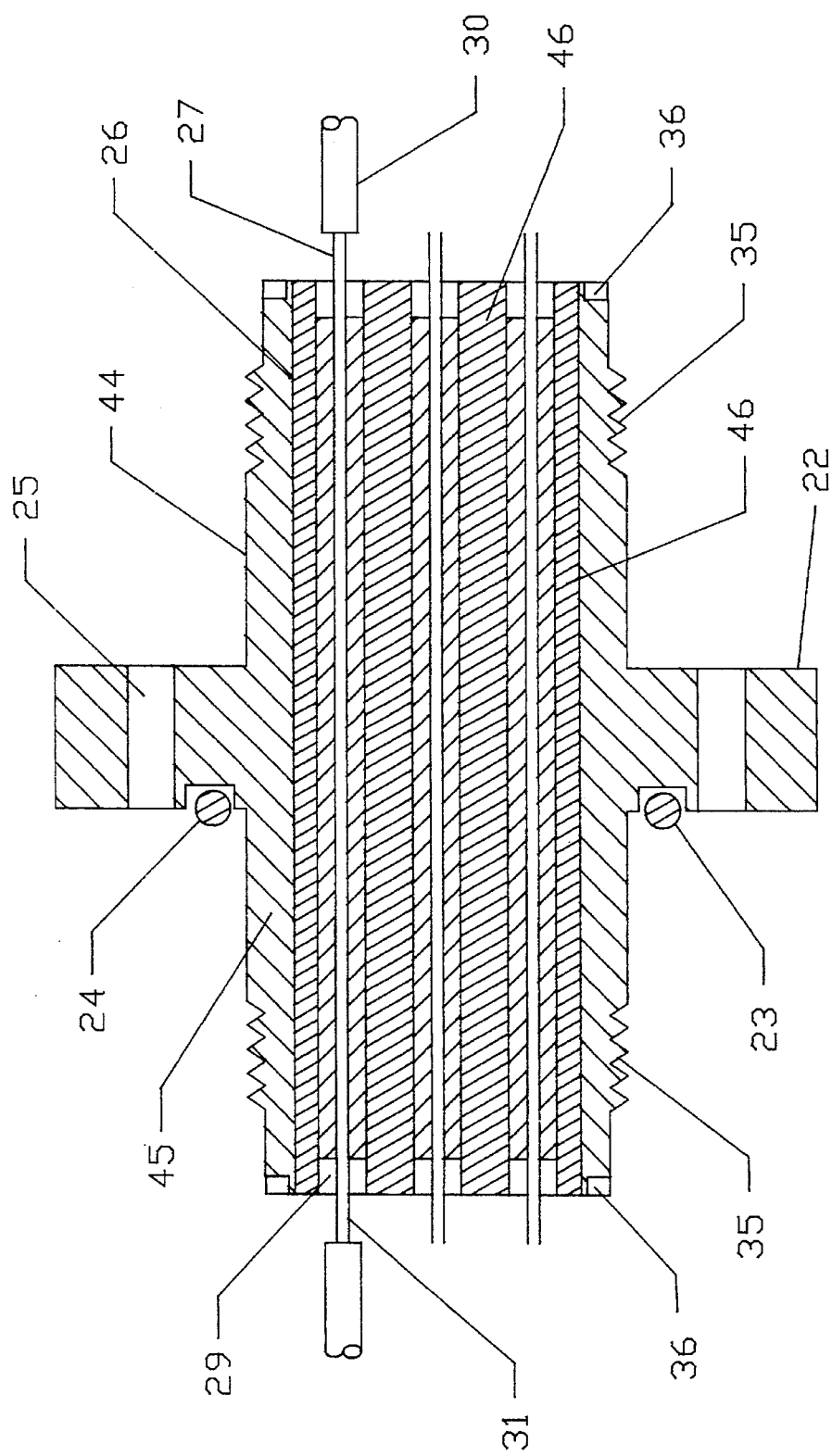
FIG. 9 is a sectional view similar to FIG. 8 with an installed and sealed insert member.

A feedthrough system 44 is shown generally in FIG. 9. The feedthrough system 44 is similar to FIG. 8. However, the lengthwise through-holes 26 of FIG. 8 are herein provided in an insert sleeve 46 made out of metallic or hermetic sealing material which is sealed hermetically into feedthrough housing 45. The separate feedthrough housing 45 and insert sleeve 46 are joined hermetically after the optical fiber 27, hermetic sealing material 28 and insert sleeve 46 have first been hermetically sealed intimately to one another. All other features and details of FIG. 9 are the same as in FIG. 8.

A feedthrough system 47 is shown generally in FIG. 10. The feedthrough system 47 is comprised of an optical fiber 27 or a plurality of optical fibers, hermetic sealing material 28, fiber optic pin termini 51, and a feedthrough housing 48 which has a flange 22 with a seal 23 located in groove 24 as described in FIG. 1. In this embodiment, the provision for mounting to the bulkhead panel is with external screw threads 52 on the feedthrough housing 48 which pass through the penetration hole of the bulkhead and are used to clamp the feedthrough system 47 to the bulkhead by means of flange nut 53. Flange nut 53 will affix said feedthrough system 47 to the bulkhead panel which will be secured between flange nut 53 and flange 22 and sealed by a seal 23 compressed simultaneously against groove 24 and the bulkhead.

This feedthrough system 47 has provision for connector mating to another separable connector half. The connector mating configuration is generally a connector receptacle 49 which may utilize bayonet threaded, breech-coupling or other connector coupling mechanism. The connector receptacle mating configuration will have fiber optic hermetically sealed pin fiber optic termini 51 with optional resilient interfacial seal/cushion 50 and features to ensure proper alignment with, and correct orientation to, the socket fiber optic termini of the mating connector plug. The fiber optic pin termini 51 will be hermetically sealed within hermetic sealing material 28 within hermetic sealing holes 26. Optical fiber 27 will be sealed within pin fiber optic termini 51 with additional hermetic sealing material 28 and optical fiber 27 will be polished to provide low-loss connectorization to the mating socket terminus. Sealing will be accomplished in such a manner as to employ proper sequencing, utilizing hermetic glass or polycrystalline sealing compounds of different melting temperatures to assure no disturbance of a complete seal when conducting the sealing operation.

An end view of the feedthrough system 47 connector end is shown in FIG. 11. One or a plurality of fiber optic pin termini 51 may be provided.

Figure 12:
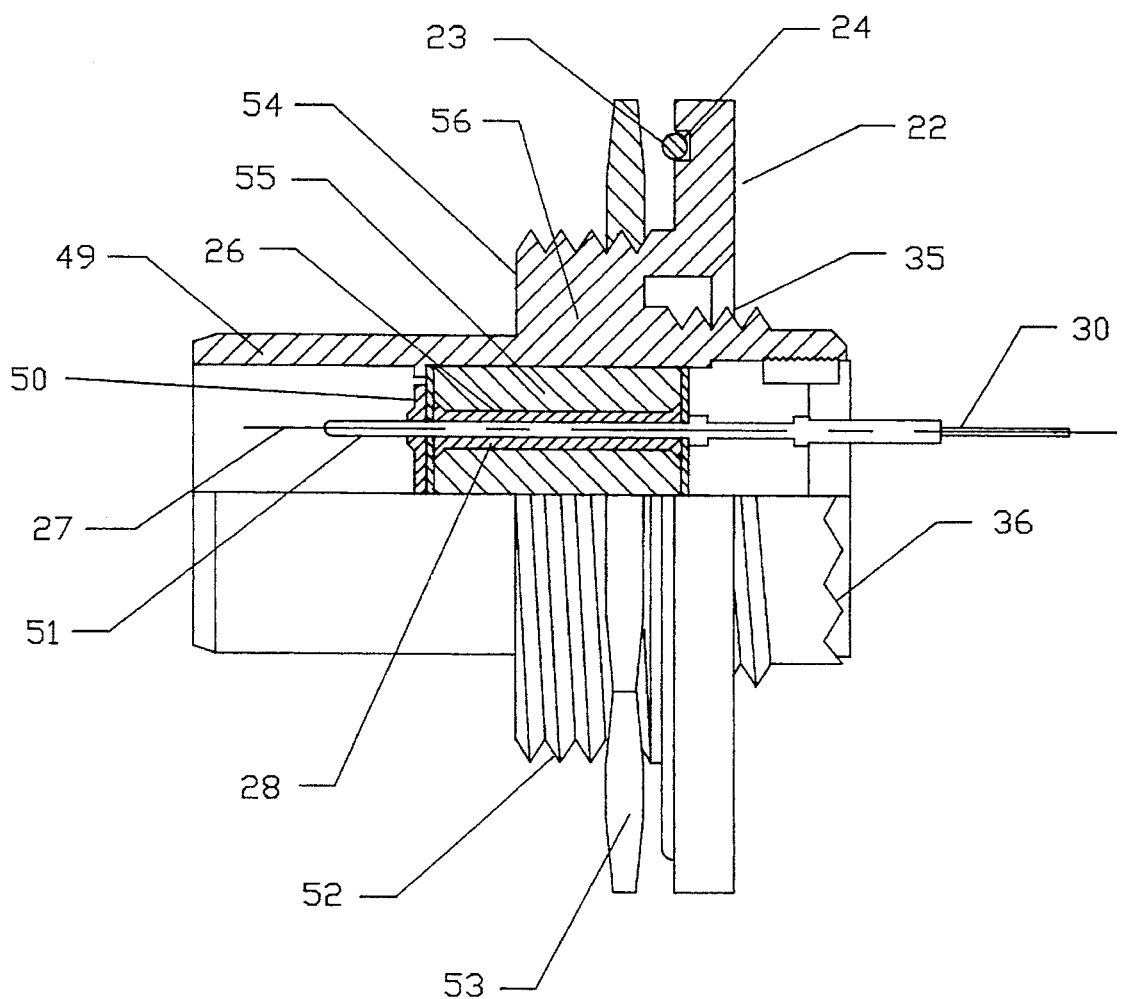
FIG. 12 is a sectional view similar to FIG. 11 with an installed and sealed insert member.

A feedthrough system 54 similar to FIG. 10 can be seen in FIG. 12. However, the lengthwise through-holes 26 of FIG. 10 are herein provided in an insert sleeve 55 fabricated of metallic or hermetic sealing material which is to be sealed hermetically into feedthrough housing 56. The separate feedthrough housing 56 and insert sleeve 55 are joined hermetically after the optical fiber 27, pin fiber optic termini 51, hermetic sealing material 28 and insert sleeve 55 have first been hermetically sealed intimately to one another. All other features and details of FIG. 12 are the same as in FIG. 10.

Figure 13:
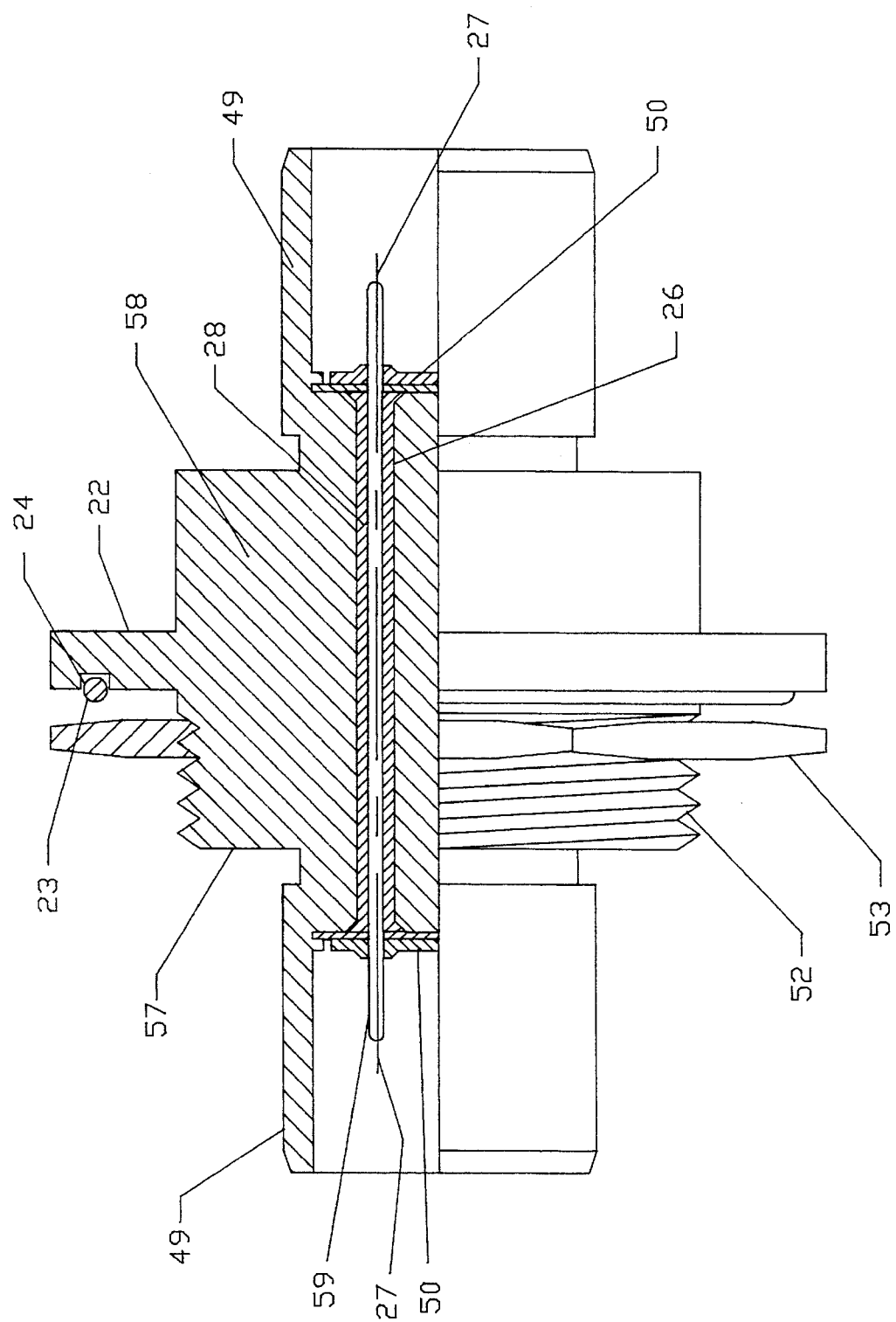
FIG. 13 is a sectional view of a bulkhead feedthrough module with provision for connectorization on both sides of the bulkhead.

A feedthrough system 57 is shown generally in FIG. 13. The feedthrough system 57 is comprised of a feedthrough housing 58 which has a flange 22 with a seal 23 located in groove 24 as described for FIG. 1; fiber optic double-ended pin termini 59, hermetic sealing material 28, and an optical fiber 27 or plurality of optical fibers. In this embodiment, the provision for mounting to the bulkhead panel is as described for FIG. 10 with external screw threads 52 and flange nut 53. This feedthrough system 57 has both ends with connector coupling mechanisms as described for FIG. 10. Since both ends have the connector receptacle configuration 49, the fiber optic pin termini 59 are double-ended, that is, they have the polished fiber end in a fiber optic pin terminus configuration on each end for mating with fiber optic socket termini in a mating plug connector half. The resilient interfacial seals/cushions 50 (optional) are as described for FIG. 10. The sealing of optical fiber(s) 27 in fiber optic pin termini 51, sealing of pin termini 59 with hermetic sealing material 28 in longitudinal through-holes 26 are as described for FIG. 10. Provision for one or a plurality of double-ended fiber optic pin termini can be accommodated.

Figure 14:
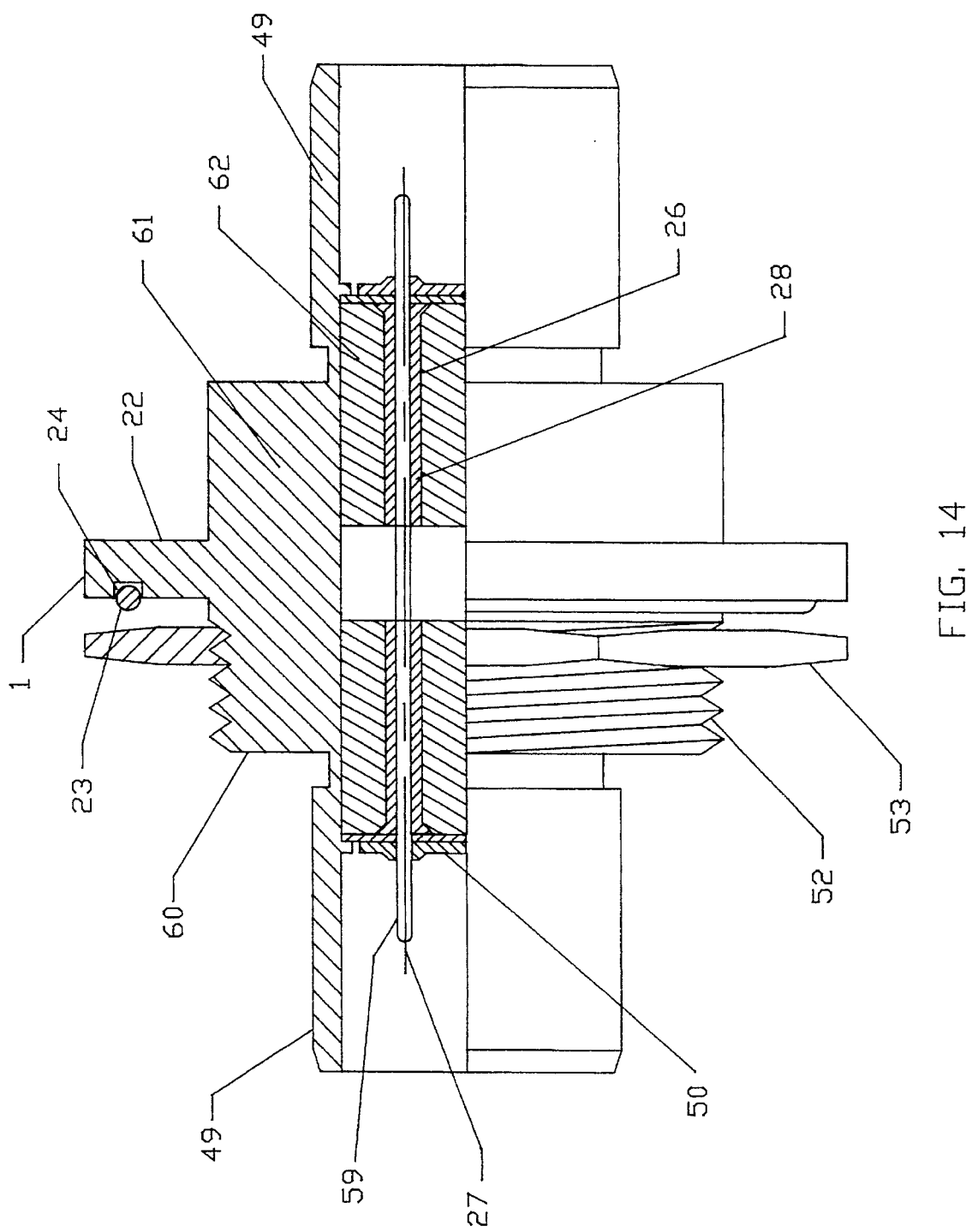
FIG. 14 is a sectional view similar to FIG. 12 with an installed and sealed insert member.

A feedthrough system 60 similar to FIG. 13 can be seen in FIG. 14. However, the lengthwise through-holes 26 of FIG. 13 are herein provided in an insert sleeve 62 made out of metallic or hermetic sealing material which is sealed hermetically into feedthrough housing 61. The separate feedthrough housing 61 and insert sleeve 62 are joined hermetically after the optical fiber 27, pin fiber optic termini 59, hermetic sealing material 28 and insert sleeve 62 have first been hermetically sealed intimately to one another. All other features and details of FIG. 14 are the same as in FIG. 13.

This invention is not to be limited by the embodiment shown in the drawings and described in the description, which is given by way of example and not of limitation but only in accordance with the scope of the appended claims.

What is claimed is:

1. A hermetic pressure differential and temperature differential feedthrough system comprising:

a signal transmitting optical fiber or plurality of optical fibers; a hermetic sealing material providing an extremely high fluid or gas differential pressure and temperature differential seal; a feedthrough housing of suitable material to provide a substantial bond between said housing and said hermetic sealing material; said signal transmitting optical fibers which are suitably cleaned and may be stripped of buffer coatings to provide a substantial bond between said fibers and said hermetic sealing material; said signal transmitting optical fibers passing through said feedthrough housing which may have a connector interface on either or both sides of said feedthrough comprised of fibers hermetically sealed within a fiber optic terminus or other system requiring interfaces and requiring interconnecting means to couple the feedthrough housing to a connector half; said bonds between said hermetic sealing material and said signal transmitting optical fiber, between said hermetic sealing material and said fiber optic termini, and between said sealing material and said housing are provided by mechanical, chemical or environmental means.

2. The feedthrough according to claim 1 wherein said signal transmitting optical fibers of suitable material which are suitably cleaned and may be stripped of buffer coatings to provide a substantial bond between said fiber and said hermetic sealing material resulting in a pressure seal capable of withstanding in excess of 30,000 psi.

3. The feedthrough according to claim 2 with hermetically coated signal transmitting optical fibers to provide a substantial bond between said fiber and said hermetic sealing material.

4. The feedthrough according to claim 3 with bare clad signal transmitting optical fibers which are suitably cleaned and stripped of buffer coatings and having suitable cladding material which provides a substantial bond between said fiber and said hermetic sealing material.

5. The feedthrough according to claim 1 wherein said hermetic sealing material consisting of an optimum combination or combinations of specific compounds providing a substantial bond between said components of the feedthrough providing a pressure seal capable of withstanding in excess of $30,000.

6. The feedthrough according to claim 2 wherein the hermetic sealing material maintains said pressure block while exposed to heat and cold within a temperature range from −200° C. to in-excess of +200° C.

7. The feedthrough according to claim 6 wherein the hermetic consists of a polycrystalline compound.

8. The feedthrough according to any of claims 2, 3, 4, 5, 6, or 7 wherein the feedthrough housing is suitable for bulkhead penetration use, which provides either a fiber or plurality of fibers passing through said feedthrough housing or a connector/termini interface on either or both sides of the bulkhead.

9. The feedthrough according to claim 8 wherein the feedthrough housing is constructed of a suitable metallic substance which provides a substantial bond between said housing and the chosen hermetic sealing material.

10. The feedthrough according to claim 8 wherein the feedthrough housing is constructed of a ceramic or glass material which provides a substantial bond between said housing and the chosen hermetic sealing material.

11. The feedthrough according to claim 8 wherein the feedthrough housing is constructed of a composite material which provides a substantial bond between said housing and the chosen hermetic sealing material.

12. The feedthrough according to claim 8 comprising one or more of the following features to allow said feedthrough to be attached to a bulkhead; a flange arrangement which allows it to be bolted to the bulkhead, threads on the outside edge to allow a flange nut to secure said feedthrough to the bulkhead, weldment of said feedthrough housing to the bulkhead or other suitable attachment configuration to meet the system requirements.

13. The feedthrough according to claim 1 wherein the feedthrough style employs one side with continuous exiting fibers and one side with features to allow addition of an accessory backshell to provide support, strain relief and protection of the signal transmitting optical fibers.

14. The feedthroughs according to claim 1 with provision for addition of an accessory backshell on both sides of the feedthrough to provide support, strain relief and protection of the signal transmitting optical fibers.

15. The feedthrough according to claim 1 with provision on one side of the feedthrough for a fiber terminating in the rear of a pin terminus and the other side of the feedthrough with provision for a connector mating mechanism and the single-ended pin termini positioned within the connector half for mating to socket termini, the connector configuration may employ any style of connector mechanism.

16. The feedthrough according to claim 15 with provision on one side of the feedthrough for connector mating and provision on the other side of the feedthrough for continuous fiber with addition of an accessory backshell to provide support, strain relief and protection of the signal transmitting optical fibers, the connector configuration may employ any style of connector mechanism.

17. A hermetic pressure differential and temperature differential feedthrough system comprising:

a signal transmitting optical fiber or plurality of optical fibers; an insert sleeve; a hermetic sealing material providing an extremely high fluid or gas differential pressure and temperature differential seal; a feedthrough housing of suitable material to provide a substantial bond between said housing and said hermetic sealing material; said insert sleeve providing a substantial bond between said sleeve and said hermetic sealing material; said signal transmitting optical fibers which are suitably cleaned and may be stripped of buffer coatings to provide a substantial bond between said fibers and said hermetic sealing material; said signal transmitting optical fibers passing through said feedthrough housing which may have a connector interface on either or both sides of said feedthrough comprised of fibers hermetically sealed within a fiber optic terminus or other system requiring interfaces and requiring interconnecting means to couple the feedthrough housing to a connector half; said bonds between said hermetic sealing material and said signal transmitting optical fiber, between said hermetic sealing material and said housing, between said hermetic sealing material and said fiber optic termini, and between said hermetic sealing material and said insert sleeve provided by mechanical, chemical or environmental means.

18. The feedthrough according to claim 17 wherein said signal transmitting optical fibers which are suitably cleaned and may be stripped of buffer coatings to provide a substantial bond between said fibers and said hermetic sealing material resulting in a pressure seal capable of withstanding in excess of 30,000 psi.

19. The feedthrough according to claim 18 with hermetically coated signal transmitting optical fibers providing a substantial bond between said fibers and said hermetic sealing material.

20. The feedthrough according to claim 19 with clad signal transmitting optical fibers which are suitable cleaned and may be stripped of buffer coatings providing a substantial bond between said fibers and said hermetic sealing material.

21. The feedthrough according to claim 17 wherein said hermetic sealing material consists of an optimum combination or combinations of specific compounds providing a substantial bond between said sealing material and said other components of the feedthrough providing a pressure seal capable of withstanding in excess of 30,000 psi.

22. The feedthrough according to any of claims 17 or 21 wherein said insert sleeve is constructed of a suitable metallic substance providing a substantial bond between said insert sleeve and said hermetic sealing material.

23. The feedthrough according to any of claims 17 or 21 wherein said insert sleeve is constructed of a ceramic or glass material providing a substantial bond between said insert sleeve and said hermetic sealing material.

24. The feedthrough according to any of claims 17 or 21 wherein said insert sleeve is constructed of a composite material providing a substantial bond between said insert sleeve and said hermetic sealing material.

25. The feedthrough according to claim 18 wherein said hermetic sealing material maintains said pressure seal while exposed within a temperature range from −200° C. to in excess of +200° C.

26. The feedthrough according to claim 25 wherein said the hermetic sealing material shall consist of a polycrystalline material.

27. The feedthrough according to any of claims 18, 19, 20, 21, 25 or 26 wherein said feedthrough is suitable for bulkhead penetration use, which provides either a fiber or plurality of fibers passing through said feedthrough housing or provides a connector terminus or termini interface on either or both sides of the bulkhead.

28. The feedthrough according to claim 27 wherein said feedthrough housing is constructed of a metallic substance suitable for providing a substantial bond between said housing and said hermetic sealing material.

29. The feedthrough according to claim 27 wherein said feedthrough housing is constructed of a ceramic or glass material suitable providing a substantial bond between said housing and said hermetic sealing material.

30. The feedthrough according to claim 27 wherein the feedthrough housing is constructed of a composite material providing a substantial bond between said housing and said hermetic sealing material.

31. The feedthrough according to claim 27 comprising any of the following features enabling said feedthrough to be attached with hermetic seal capability to a bulkhead;

a flange arrangement which allows it to be bolted to the bulkhead, threads concentric on the outside surface allowing a flange nut to secure said feedthrough with a pressure seal to the bulkhead, weldment of said feedthrough housing to the bulkhead or other attachment means of a pressure sealing and mechanical attaching configuration.

* * * * *